(12) United States Patent
Kim et al.

(10) Patent No.: US 9,963,814 B2
(45) Date of Patent: *May 8, 2018

(54) WASHING MACHINE

(71) Applicant: LG ELECTRONICS INC., Seoul (KR)

(72) Inventors: Youngjun Kim, Seoul (KR); Insik Yu, Seoul (KR); Youngjong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

This patent is subject to a terminal disclaimer.

(21) Appl. No.: 14/796,147

(22) Filed: Jul. 10, 2015

(65) Prior Publication Data

US 2016/0010260 A1  Jan. 14, 2016

(30) Foreign Application Priority Data

Jul. 11, 2014 (KR) .......................... 10-2014-0087718
Jul. 11, 2014 (KR) .......................... 10-2014-0087720

(51) Int. Cl.
*D06F 37/20* (2006.01)
*D06F 37/26* (2006.01)
(Continued)

(52) U.S. Cl.
CPC .............. *D06F 37/20* (2013.01); *D06F 37/24* (2013.01); *D06F 37/264* (2013.01);
(Continued)

(58) Field of Classification Search
CPC .......... D06F 37/24; D06F 37/20; D06F 37/22; D06F 37/268; F16F 7/095; F16F 7/08; F16F 7/09
(Continued)

(56) References Cited

U.S. PATENT DOCUMENTS 5,946,946 A * 9/1999 Sharp ...................... D06F 37/20
188/129
6,397,643 B1 * 6/2002 Chang ..................... D06F 37/24
68/23.1
(Continued)

FOREIGN PATENT DOCUMENTS

CN        102971457 A    3/2013
CN        103109010 A    5/2013
(Continued)

OTHER PUBLICATIONS

Machine translation of JP 2000126490 A, dated May 2000.*

*Primary Examiner* — Michael E Barr
*Assistant Examiner* — Kevin G Lee
(74) *Attorney, Agent, or Firm* — Dentons US LLP

(57) ABSTRACT

A washing machine including a casing, an outer tub, a support rod having one end connected to the casing and the other end having a support prop, first and second friction units movable along the support rod and applying frictional force between the friction units and the support rod, a receiving body movable along the support rod, the receiving body retaining the first and second friction units, the receiving body is integrally moved with the first friction unit and is displaceable relative to the second friction unit, an outer tub supporter movable along the support rod and formed independently of the receiving body to support the outer tub above the receiving body, and an elastic member supported by the support prop and elastically supporting the receiving body.

29 Claims, 12 Drawing Sheets

(51) Int. Cl.
*F16F 7/08* (2006.01)
*D06F 37/24* (2006.01)
*D06F 37/14* (2006.01)

(52) U.S. Cl.
CPC .............. *D06F 37/268* (2013.01); *F16F 7/08* (2013.01); *D06F 37/14* (2013.01)

(58) Field of Classification Search
USPC ................................................. 68/23.1, 23.4
See application file for complete search history.

(56) References Cited

U.S. PATENT DOCUMENTS

| | | | |
|---|---|---|---|
| 2011/0308281 A1* | 12/2011 | Yu ........................... | D06F 37/24 68/212 |
| 2014/0060120 A1* | 3/2014 | Yu ........................... | D06F 37/24 68/132 |
| 2014/0090939 A1* | 4/2014 | Kanioz .................... | F16F 7/09 188/271 |
| 2016/0024705 A1* | 1/2016 | Hernden ................. | D06F 37/24 267/140.13 |

FOREIGN PATENT DOCUMENTS

| | | | | |
|---|---|---|---|---|
| JP | 11244573 A | | 9/1999 | |
| JP | 200012690 A | | 5/2000 | |
| JP | 2000126490 A | * | 5/2000 | |
| JP | 2008142524 A | * | 6/2008 | |
| KR | 2020090012698 U | | 12/2009 | |
| WO | 2013125898 A1 | | 8/2013 | |
| WO | WO 2015151020 A1 | * | 10/2015 | ............. D06F 37/22 |

* cited by examiner

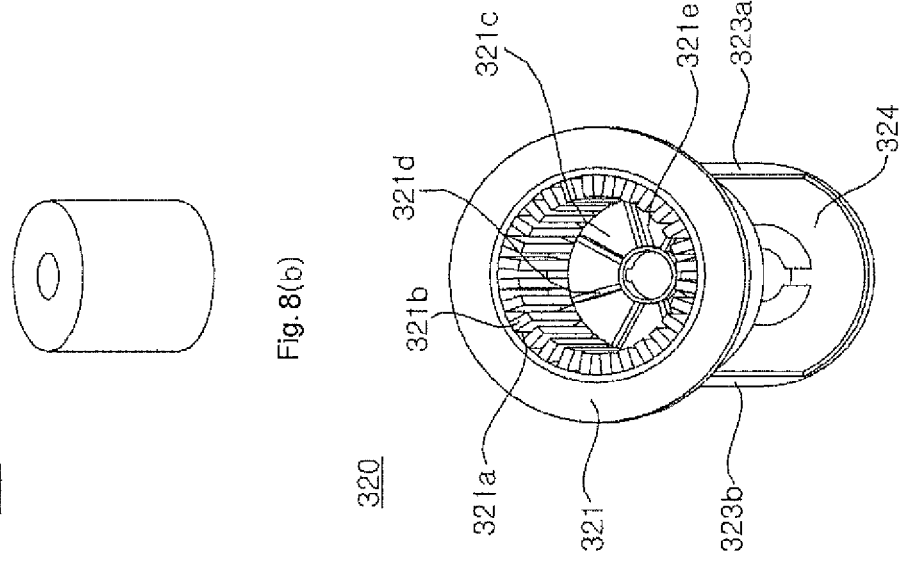
Fig. 8(b)
Fig. 8(c)
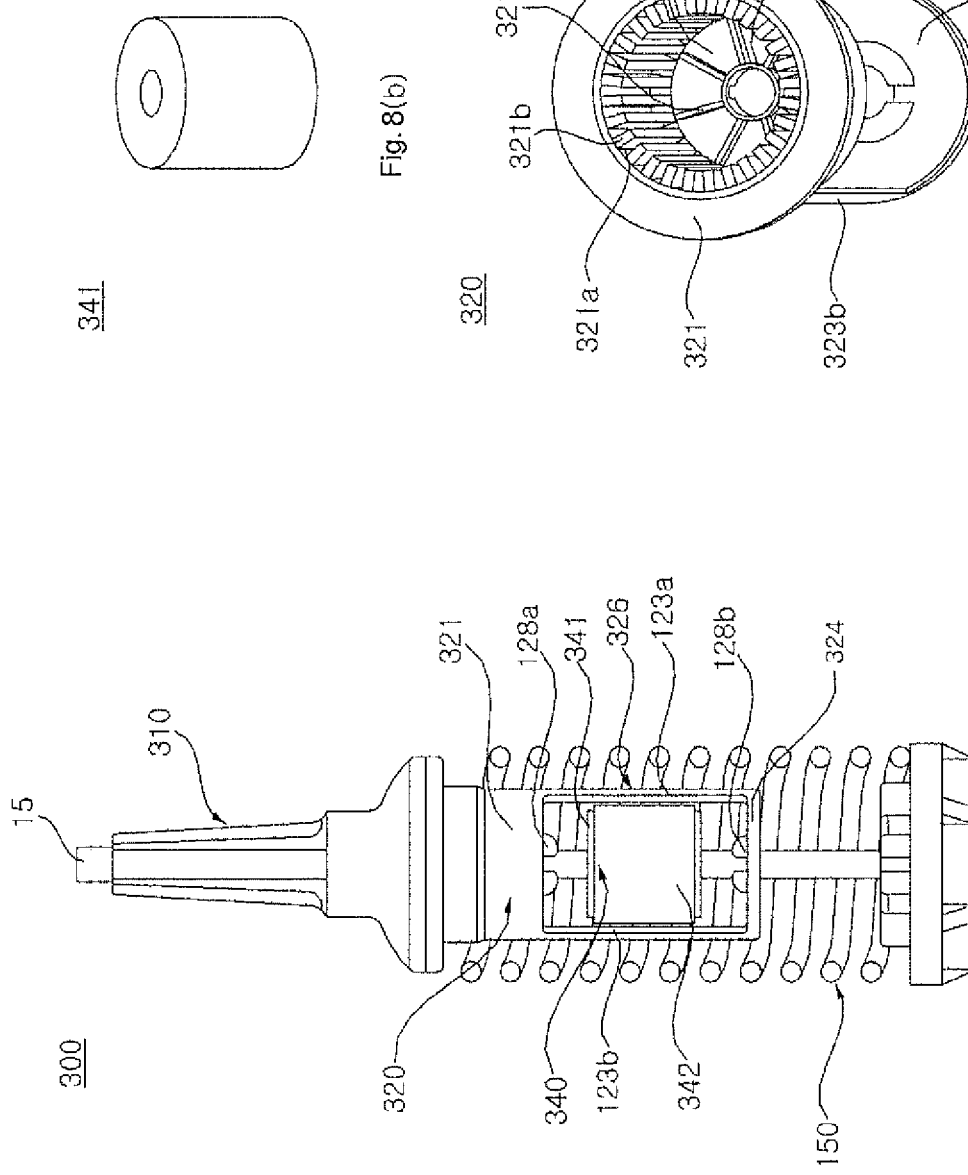
Fig. 8(a)

WASHING MACHINE

CROSS-REFERENCE TO RELATED APPLICATION

This application claims the priority benefit of Korean Patent Application Nos. 10-2014-0087718 and 10-2014-0087720 each filed on Jul. 11, 2014 in the Korean Intellectual Property Office, the disclosure of each is incorporated herein by reference.

BACKGROUND

1. Field

The present disclosure relates to a washing machine and, more particularly, to a washing machine which is capable of effectively attenuating vibrations.

2. Description of the Related Art

Generally, a washing machine is an apparatus that washes laundry using, for example, emulsified detergent, water streams generated by the rotation of a wash tub or a pulsator, and shocks applied by the pulsator. The washing machine implements washing, rinsing, and/or dehydration to remove contaminants attached to the laundry (hereinafter referred to as "clothing") using the action of detergent and water.

A conventional washing machine includes a casing defining the external appearance of the washing machine, an outer tub disposed inside the casing in a suspended form, and an inner tub rotatably provided inside the outer tub. Additionally, the washing machine further includes a suspension to prevent the outer tub from vibrating due to the rotation of the inner tub and/or the pulsator.

The suspension is typically configured to attenuate vibrations generated from the outer tub using, for example, the elasticity/restoration of springs or the viscosity of fluid. However, although this suspension may effectively attenuate vibrations in the normal vibration state, in which the outer tub vibrates within a given amplitude range, it is limited in the attenuation of vibrations in the excessive vibration state, in which the outer tub vibrates at a greater amplitude than that of the normal vibration state.

That is, in the case where the typical suspension is designed to be optimized for the excessive vibration state exhibiting a greater amplitude, the ability to attenuate normal vibrations, having a relatively small amplitude, is deteriorated. In contrast, in the case where the typical suspension is designed to be optimized for the normal vibration state, vibration attenuation sufficient to attenuate excessive vibrations cannot be expected. Therefore, there is a need to find a method for effectively attenuating vibrations both in the normal vibration state and the excessive vibration state.

In addition, although the typical suspension functions to attenuate vibrations by converting vibration into heat via friction between a support rod and a friction member moving along the support rod, this may problematically cause thermal degeneration of the friction member due to frictional heat or also cause deterioration of friction as the friction member sticks to the support rod. In particular, lubricant is applied to the support rod, in order to maintain a constant viscosity between the support rod and the friction member and to prevent overheating caused by friction. In the conventional washing machine, it is difficult to supplement the lubricant during the process of maintenance and repair.

In addition, although most constituent components of the suspension are formed by injection molding a synthetic resin, such molding becomes difficult as the structure in which the friction member is to be received becomes complicated. The constituent components of the suspension must have sufficient durability because they are operated in connection with elastic members such as springs during the vibration of the outer tub, and some portions, which need a great material thickness for durability, may be constricted during injection molding.

SUMMARY

Therefore, the present disclosure is made to solve the problems as described above and it is a first object to provide a washing machine having a suspension which enables easy lubricant supplementation.

It is another object to provide a washing machine in which a receiving body, which receives a friction unit to generate frictional force along with a support rod, is separable from an outer tub supporter which supports an outer tub at the upper side of the receiving body.

It is still another object to provide a washing machine which exhibits different aspects of vibration attenuation in the normal vibration state, in which the amplitude of vibration of an outer tub is within a prescribed range, and in the excessive vibration state, in which the amplitude of vibration of the outer tub is relatively great.

It is yet another object to provide a washing machine which is capable of attenuating vibrations of an outer tub, thereby achieving the improved utility of space inside a casing and, especially, the increased capacity of the outer tub compared with the related art.

It is another object to provide a washing machine which is capable of achieving enhanced durability and stability and reducing the generation of noise due to vibrations.

It is another object to provide a washing machine which enables simplified supplementation of lubricant in a suspension.

It is a further object to provide a washing machine in which an injection molded component constituting a suspension is reduced in thickness, thereby restricting constriction during injection molding while achieving sufficient durability.

In accordance with one embodiment of the present invention, the above and other objects can be accomplished by the provision of a washing machine including a casing, an outer tub disposed within the casing to receive wash water therein, a support rod having one end connected to the casing, the other end of the support rod having a support prop, a first friction unit and a second friction unit movable along the support rod applying a frictional force between the first and second friction units and the support rod, a receiving body movable along the support rod, the receiving body retaining the first friction unit and the second friction unit and being integrally moved with the first friction unit and displaceable relative to the second friction unit, an outer tub supporter movable along the support rod, the outer tub supporter being formed independently of the receiving body to support the outer tub at the upper side of the receiving body, and an elastic member supported by the support prop and elastically supporting the receiving body.

BRIEF DESCRIPTION OF THE DRAWINGS

The embodiments will be described in detail with reference to the following drawings in which like reference numerals refer to like elements wherein:

FIG. 8(a) is a view illustrating a suspension according to a third embodiment of the present invention, and FIGS. 8(b) and 8(c) are views respectively illustrating a friction member and a receiving body applied to the suspension;

DETAILED DESCRIPTION

Figure 1:
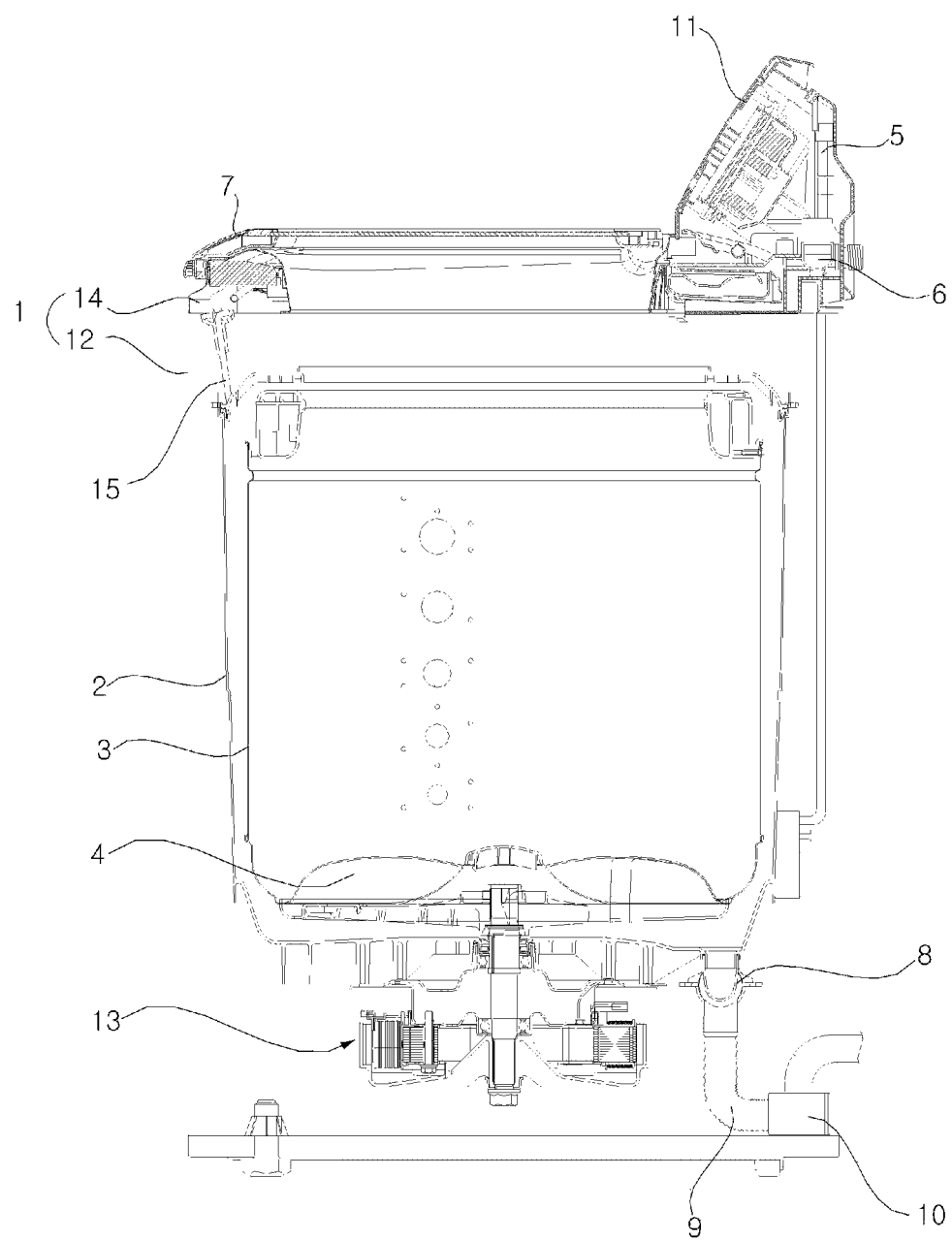
FIG. 1 is a side sectional view of a washing machine according to one embodiment of the present invention.

Advantages, features, and methods for achieving those of embodiments may become apparent upon referring to the embodiments described later in detail together with attached drawings. However, embodiments are not limited to the embodiments disclosed hereinafter, but may be embodied in different modes. The same reference numerals may refer to the same elements throughout the specification.

A washing machine according to the embodiments of the present invention that will be described below include a casing, an outer tub to receive wash water therein, a support rod having one end connected to the casing and the other end having a support prop, a first friction unit and a second friction unit configured to be movable along the support rod so as to apply frictional force between the first and second friction units and the support rod, a receiving body configured to be movable along the support rod, the receiving body retaining the first friction unit and the second friction unit and being integrally moved with the first friction unit and displaceable relative to the second friction unit, an outer tub supporter movable along the support rod, the outer tub supporter being formed independently of the receiving body to support the outer tub at the upper side of the receiving body, and an elastic member supported by the support prop and to elastically support the receiving body.

Hereinafter, the embodiments will be described in detail with reference to the drawings.

Figure 2:
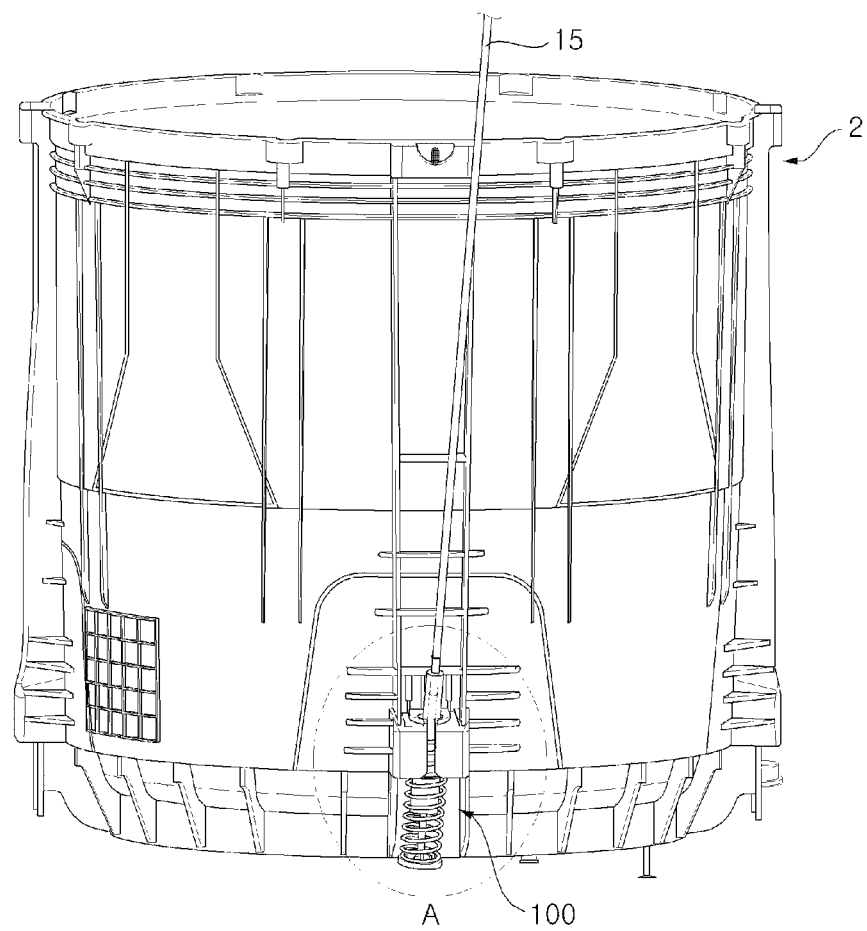
FIG. 2 is a partial perspective view illustrating a configuration in which a suspension is mounted to an outer tub illustrated in FIG. 1.
Figure 3:
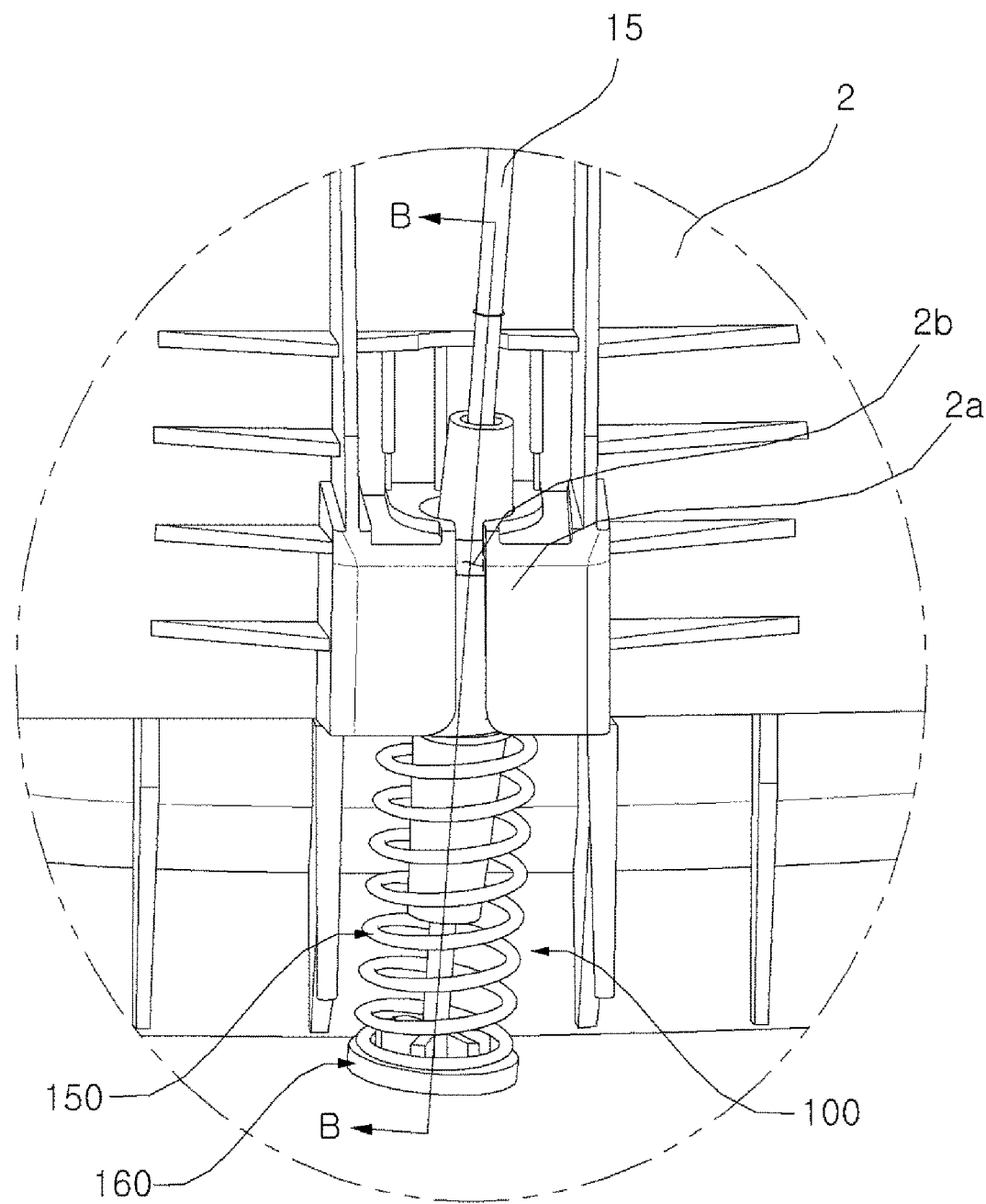
FIG. 3 is a partial enlarged view of portion A illustrated in FIG. 2.

FIG. 1 is a side sectional view of a washing machine according to one embodiment of the present invention. FIG. 2 is a partial perspective view illustrating a configuration in which a suspension is mounted to an outer tub illustrated in FIG. 1. FIG. 3 is a partial enlarged view of portion A illustrated in FIG. 2.

Referring to FIGS. 1 to 3, the washing machine according to one embodiment of the present invention includes a casing 1 which defines the external appearance of the washing machine, a control panel 11 which includes, for example, operating keys to receive various control instructions input by a user and a display unit to display information regarding the operating state of the washing machine, thereby constituting a user interface, and a door 7 which is rotatably coupled to casing 1 to open or close an introduction/removal hole (not illustrated) for the introduction and removal of laundry.

An outer tub 2, in which wash water is received, is suspended inside casing 1 by a support rod 15, and an inner tub 3, in which laundry is received, is provided inside outer tub 2 so as to be rotatable about a vertical axis. A pulsator 4 is rotatably installed at bottom of inner tub 3. Inner tub 3 has a plurality of holes for the passage of wash water.

Although the casing defined in the present invention is sufficient so long as it forms the external appearance of the washing machine, in particular, the casing may be a stationary body which is immovable so that one end of support rod 15, which suspends outer tub 2 inside the casing, may be fixed by the casing. Casing 1 as described below is merely one example of a structure forming the external appearance of the washing machine and it is specified that the range of the casing described in the claims of the present application should not be limited thereto.

Casing 1 includes a cabinet 12 having an open upper side and a top cover 14 provided at the upper side of cabinet 12, top cover 14 being formed at an approximately central portion thereof with an introduction/removal hole for the introduction and removal of laundry.

Support rod 15 extends by a long length in the longitudinal direction thereof and has one end connected to casing 1 and the other end connected to outer tub 2 via a suspension 100. One end of support rod 15 may be connected to any one of cabinet 12 and top cover 14, and cabinet 12 or top cover 14 may include a connector (not illustrated) which is pivotally connected to support rod 15.

Support rod 15 may include a support prop 160 provided at the other end thereof. Support prop 160 serves to support an elastic member 150 fitted around support rod 15 so as not to be separated from support rod 15. Support prop 160 has a support surface to support a lower end of elastic member 150 so as to prevent elastic member 150 from being separated from support rod 15, and the support surface may have a greater area than the cross section of elastic member 150.

Rotation of elastic member 150 about support rod 15 may be restricted by support prop 160. In some embodiments, support prop 160 may be formed with a coupling portion to be coupled to the lower end of elastic member 150, or may be formed with a raised portion to limit the rotation of the lower end of elastic member 150.

A water supply flow path 5 is connected to an external water source such as, for example, a water tap to supply water into outer tub 2 and/or inner tub 3. A water supply valve 6 is provided to control water supply flow path 5. A drive unit 13 serves to drive inner tub 3 and/or pulsator 4. A drain flow path 9 is connected to outer tub 2 to discharge wash water from outer tub 2. A drain valve 8 is provided to control drain flow path 9. A drain pump 10 is installed to drain flow path 9 to pump the discharged wash water to the outside of the washing machine.

Suspension 100 serves to attenuate vibrations of outer tub 2 attributable to the rotation of inner tub 3 or pulsator 4. Suspension 100 is coupled to a lower end of outer tub 2. This coupling may be separable coupling to ensure easy installation and separation of suspension 100. For example, FIG. 3 illustrates a mount 2a which protrudes from the outer circumferential surface of a lower portion of outer tub 2 for the installation of suspension 100, and mount 2a may be formed with a slit 2b which extends in the vertical direction and is open in the lateral direction.

To couple suspension 100 and outer tub 2 to each other, once suspension 100 has been installed to support rod 15, support rod 15 is inserted into mount 2a through a lateral opening of slit 2b and mount 2a is seated on an outer tub supporter 110 that will be described below. Since the weight of outer tub 2 is continuously applied to outer tub supporter 110, outer tub 2 and outer tub supporter 110 are integrally moved without separation. Meanwhile, separation of suspension 100 for maintenance and repair is easily implemented by pulling suspension 100 slightly downward and removing support rod 15 through the lateral opening of slit 2b.

In the following description of the embodiments of the suspension with reference to the drawings, common components of the washing machine to which the suspension is applied will refer to FIGS. 1 to 3.

Figure 4:
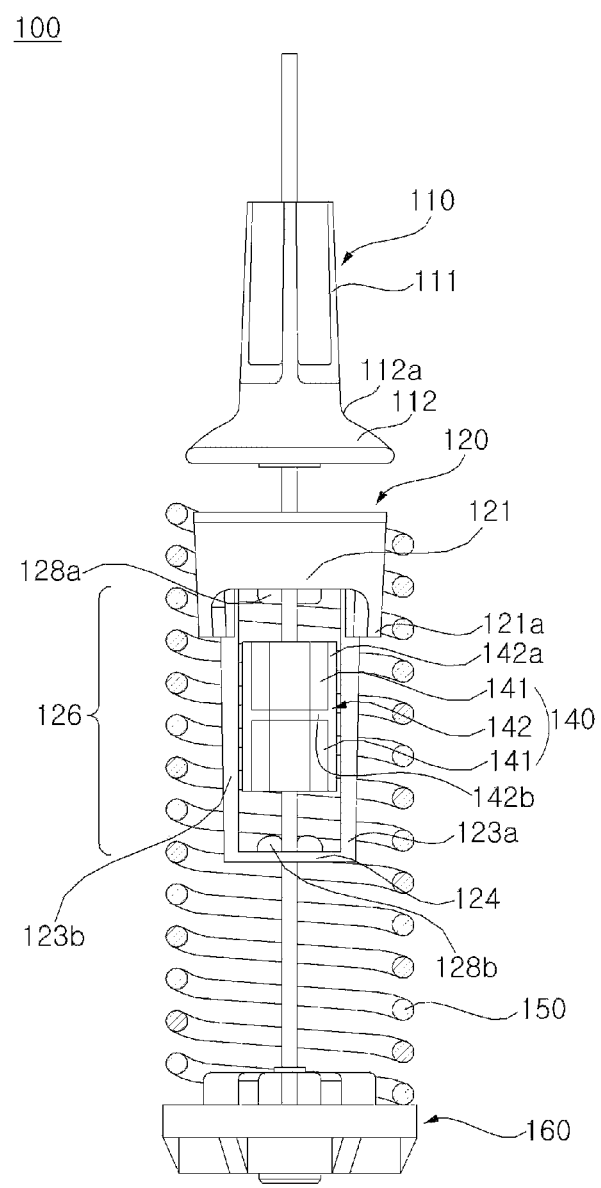
FIG. 4 is a view illustrating a suspension according to a first embodiment of the present invention.
Figure 5:
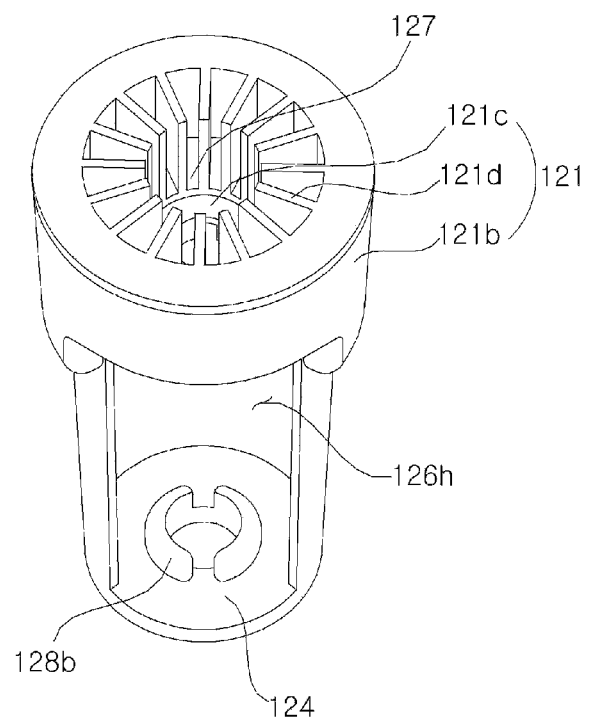
FIG. 5 is a view illustrating a receiving body illustrated in FIG. 4.
Figure 6:
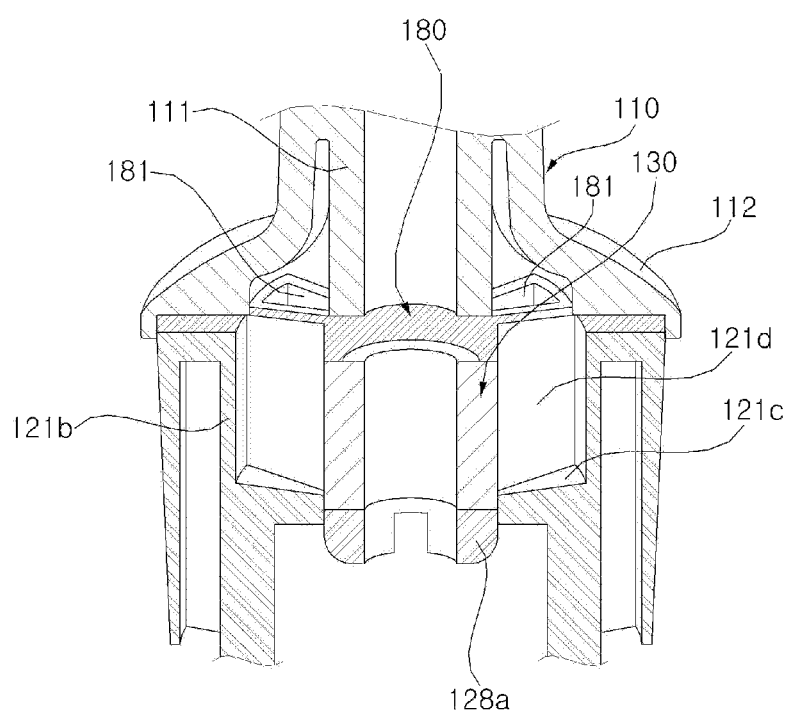
FIG. 6 is a cross sectional view illustrating a coupling portion of an outer tub supporter and the receiving body.

FIG. 4 is a view illustrating a suspension according to a first embodiment of the present invention. FIG. 5 is a view illustrating a receiving body illustrated in FIG. 4. FIG. 6 is a cross sectional view illustrating a coupling portion of an outer tub supporter and the receiving body.

Referring to FIGS. 4 to 6, suspension 100 includes outer tub supporter 110, a receiving body 120, elastic member 150, a first friction unit 130, and a second friction unit 140.

Outer tub supporter 110 is configured to support outer tub 2 and is movable along support rod 15. Outer tub supporter 110 may include a tubular slider 111 for the penetration of support rod 15 and a seating portion 112 expanding outward from slider 111 to form a seating surface 112a on which outer tub 2 is seated. Seating portion 112 may be caught by mount 2a of outer tub 2 and an upper end of slider 111 may protrude upward from mount 2a.

Receiving body 120 is movable along support rod 15 and elastically supported by elastic member 150. A lower end of elastic member 150 is supported by support prop 160 and an upper end of elastic member 150 supports receiving body 120.

Outer tub supporter 110 supports outer tub 2 at the upper side of receiving body 120. Outer tub supporter 110 may be formed as a unit separated from receiving body 120. This configuration ensures easy injection of lubricant. It is necessary to inject or supplement lubricant during the process of manufacturing the washing machine as well as when performing maintenance and repair during the useful lifetime thereof. At this time, outer tub supporter 110, separated from receiving body 120, is pushed upward to expose support rod 15 covered with outer tub supporter 110, and the lubricant may be directly applied to the exposed portion. In addition, the lubricant may also be injected to first friction unit 130 or second friction unit 140, which are arranged inside receiving body 120. This lubricant injection is very convenient because it can be performed even without separating suspension 100 from support rod 15.

Meanwhile, even if outer tub supporter 110 and receiving body 120 are not firmly coupled to each other, outer tub supporter 110 and receiving body 120 may be integrated with each other, i.e. they may be moved together along support rod 15 by the weight of outer tub 2 applied to outer tub supporter 110 and the restoration of elastic member 150 that supports receiving body 120 because outer tub supporter 110 supports outer tub 2 at the upper side of receiving body 120.

First friction unit 130 and second friction unit 140 are movable along support rod 15 respectively such that frictional force (more particularly, kinetic friction during the vibration of outer tub 2) is generated between the respective friction units and support rod 15. First friction unit 130 and second friction unit 140 are received in receiving body 120. First friction unit 130 and second friction unit 140 may respectively include friction members to generate frictional force between the respective friction units 130 and 140 and the outer circumferential surface of support rod 15.

Receiving body 120 may retain first friction unit 130 and second friction unit 140. When being moved along support rod 15, receiving body 120 may be moved integrally with first friction unit 130, but may be displaceable relative to second friction unit 140.

The friction members constituting first friction unit 130 and/or second friction unit 140 may be formed of a porous fiber material such as, for example, felt, or may be formed of an elastic material such as, for example, rubber. In addition, in terms of the shape, the friction members may have a tubular shape so as to be fitted around support rod 15, or may take the form of a flexible sheet or band so as to be wound around the outer circumferential surface of support rod 15. In particular, the fibrous friction member has excellent absorbency for a lubricant. Hereinafter, the friction member included in first friction unit 130 is referred to as a first friction member and the friction member included in second friction unit 140 is referred to as a second friction member.

In some embodiments, each of first friction unit 130 and second friction unit 140 may include a receptacle (for example, a second friction member housing 142) to receive the friction member therein. The receptacle is configured to firmly support the friction member and to maintain the outer appearance of the friction unit and is adapted to slide along the inner circumferential surface of receiving body 120, thereby stably supporting the movement of friction units 130 and 140. However, since first friction unit 130 is fixed to receiving body 120 and is sufficiently supported by a first receiving portion 121 of receiving body 120, hereinafter, the case where first friction unit 130 is the friction member itself will be described by way of example.

Friction between the two friction units 130 and 140 and support rod 15 exhibits different aspects based on the amplitude of vibration of outer tub 2. For example, when operating the washing machine, in the case where outer tub 2 resonates based on the physical properties of the entire vibration system, or for an excessive vibration period, during which excessive vibrations are generated due to the unbalanced arrangement of clothing inside inner tub 3, first friction unit 130 and second friction unit 140 are moved integrally with outer tub supporter 110 (or receiving body 120), causing kinetic friction between friction units 130 and 140 and support rod 15. Accordingly, for the excessive vibration period, vibration energy is positively dissipated by friction of both first and second friction units 130 and 140.

On the other hand, for a period, during which the amplitude of vibration of outer tub 2 is sufficiently lower than that of the excessive vibration period (e.g., a normal vibration period), only first friction unit 130 performs vibration attenuation by friction. That is, second friction unit 140 may remain stationary at a prescribed position on support rod 15 while being separated from receiving body 120 when first friction unit 130 is moved along support rod 15. Outer tub 2 can vibrate relatively freely while vibration attenuation by friction is implemented only by first friction unit 130.

That is, when operating the washing machine, suspension 100 implements vibration attenuation using one friction unit 130 during the relatively stable period, but implements positive attenuation by friction using the two friction units 130 and 140 during the excessive vibration period. That is, the washing machine according to the present embodiment allows outer tub 2 to be moved relatively freely within a predetermined allowable amplitude range in consideration of, for example, the durability of the appliance and an allowable vibration displacement, but more positively attenuates vibrations to limit the amplitude of vibration when vibrations are generated beyond a given level. As such, the washing machine shows different aspects of vibration attenuation based on the amplitude of vibration.

To allow vibration attenuation by first friction unit 130 and second friction unit 140 to be implemented in different aspects depending on the amplitude of vibration of outer tub 2, first, the maximum displacement of second friction unit 140 must be greater than the maximum displacement of first friction unit 130 which is permitted due to their relationships with respect to receiving body 120. Preferably, first friction unit 130 is fixed to receiving body 120 and second friction unit 140 is permitted to be displaced relative to receiving body 120 within the space delimited by receiving body 120.

In this sense, receiving body 120 includes first receiving portion 121 in which first friction unit 130 is received, and a second receiving portion 126 in which second friction unit 140 is received. First friction unit 130 is fixed to receiving body 120 inside first receiving portion 121. Second receiving portion 126 provides a space for reception of second friction unit 140, which is longer than the longitudinal length of second friction unit 140, so as to permit relative movement between receiving body 120 and second friction unit 140.

Second receiving portion 126 may be located below first receiving portion 121, and receiving body 120 may include a partition 121c to separate first receiving portion 121 and second receiving portion 126 from each other. Support rod 15 passes through the central portion of partition 121c. On the basis of partition 121c, first receiving portion 121 is defined as an upper portion of receiving body 120 and second receiving portion 126 is defined as a lower portion of receiving body 120.

First receiving portion 121 may include a tubular upper side portion 121b, through the center of which support rod 15 passes. Upper side portion 121b extends upward from partition 121c. Lubricant may be received in the space delimited by upper side portion 121b and partition 121c. First friction member 130 may be submerged in the lubricant depending on the materials thereof, and some of the lubricant may permeate through a gap between first friction member 130 and partition 121c to reach support rod 15.

Meanwhile, first receiving portion 121 may include a plurality of ribs 121d which extend from the inner circumferential surface of upper side portion 121b toward the center at which support rod 15 is located. Ribs 121d have outer ends connected to the inner circumferential surface of upper side portion 121b and lower ends connected to upper surface of partition 121c. First friction member 130 is interposed between inner ends of ribs 121d and support rod 15. First friction member 130 is disposed in a space 127 which is delimited by the inner ends of ribs 121d. First friction member 130, which has been compressed to a given level, may be fitted into space 127 such that the outer circumferential surface of first friction member 130 continuously remains in contact with the inner ends of ribs 121d. In addition, the inner ends of ribs 121d may radially extend to converge toward the center of upper side portion 121b. Ribs 121d may be symmetrically arranged about the center.

Since the space is formed around the periphery of first friction member 130 and the lubricant or air is received in the space, heat generated by the friction between first friction member 130 and support rod 15 may be easily dissipated. This may prevent first friction member 130 from being degenerated by high temperature heat, or may prevent first friction member 130 from sticking to support rod 15.

Meanwhile, to achieve more positive heat dissipation, as exemplarily illustrated in FIG. 5, first receiving portion 121 may be configured such that the space in which first friction member 130 is received is open.

Second receiving portion 126 may include lower side portions 123a and 123b which extend downward from first receiving portion 121 to form a space for the reception of second friction unit 140. Although the lower side portions may be configured as a tubular portion extending throughout the periphery of upper side portion 121b, as exemplarily illustrated in FIG. 5, second friction unit 140 may have openings 126h which are open in the transverse direction for ventilation of the space for the reception of second friction unit 140. This has the effect of radiating frictional heat generated by second friction unit 140 through openings 126h.

More specifically, second receiving portion 126 may include a bottom portion 124 which delimits a lower end of the space for the reception of second friction unit 140 and lower side portions 123a and 123b which connect bottom portion 124 and first receiving portion 121 to each other. Although a first lower side portion 123a and a second lower side portion 123b are provided with openings 126h interposed therebetween in the present embodiment, the present invention should not be limited thereto and an opening may be formed in the lower side portion.

Second friction unit 140 is moved by being pushed by receiving body 120 when the amplitude of vibration of outer tub 2 reaches a given level or higher. In the embodiment, second friction unit 140 is moved downward by being pushed by partition 121c and is moved upward by being pushed by bottom portion 124.

Second friction unit 140 may further include friction member housing 142 in which second friction members 141 are received at upper and lower positions. Friction member housing 142 may include a tubular housing side portion 142a and a division plate 142b which divides a space inside housing side portion 142a into upper and lower spaces, support rod 15 penetrating division plate 142b. Friction member housing 142 may receive second receiving members 141 respectively in the upper and lower spaces divided by division plate 142b.

Partition 121c may include at least one protrusion 128a which protrudes downward from the lower surface thereof. Protrusion 128a may be formed around an aperture, through which support rod 15 passes. When receiving body 120 is moved downward, protrusion 128a comes into contact with an upper end of second friction unit 140. Protrusion 128a may be located to come into contact with second friction member 141.

Bottom portion 124 may include at least one protrusion 128b which protrudes upward from the upper surface thereof. Protrusion 128b may be formed around an aperture, through which support rod 15 passes. When receiving body 120 is moved upward, protrusion 128b comes into contact with a lower end of second friction unit 140. Protrusion 128b may be located to come into contact with second friction member 141.

This configuration in which protrusions 128a and 128b are formed at partition 121c or bottom portion 124 has the effect of reducing the collision area between receiving body 120 and second friction members 141, thereby reducing collision noise.

Meanwhile, receiving body 120 is supported by elastic member 150. Receiving body 120 may include an outer circumferential protruding portion 121a which protrudes further outward than does lower side portions 123a and 123b so as to be supported at a lower end thereof by an upper end of elastic member 150. In the present embodiment, outer circumferential protruding portion 121a extends from first receiving portion 121 to the outside of lower side portions 123a and 123b.

Only a small clearance may be present between outer tub supporter 110 and receiving body 120 during the vibration of outer tub 2. For example, in the case where outer tub 2 is moved upward a considerably great height during the vibration thereof or in the case where the speed of upward movement of outer tub 2 is greater than the restoration speed of elastic member 150, outer tub supporter 110 and receiving body 120 may be very close to each other. Outer tub supporter 110 and receiving body 120, separated from each other as described above, may cause collision noise when outer tub 2 is moved downward and may have a bad effect on durability. To solve this problem, suspension 100 may further include a damping member 180 interposed between outer tub supporter 110 and receiving body 120. Damping member 180 may be formed of a porous fiber material or an elastic material such as, for example, rubber.

Damping member 180 may have openings 181 which communicate with the interior of first receiving portion 121. In this case, heat generated by first friction member 130 is radiated through openings 181. Openings 181 may be located to correspond to gaps between neighboring ribs 121d.

Figure 7:
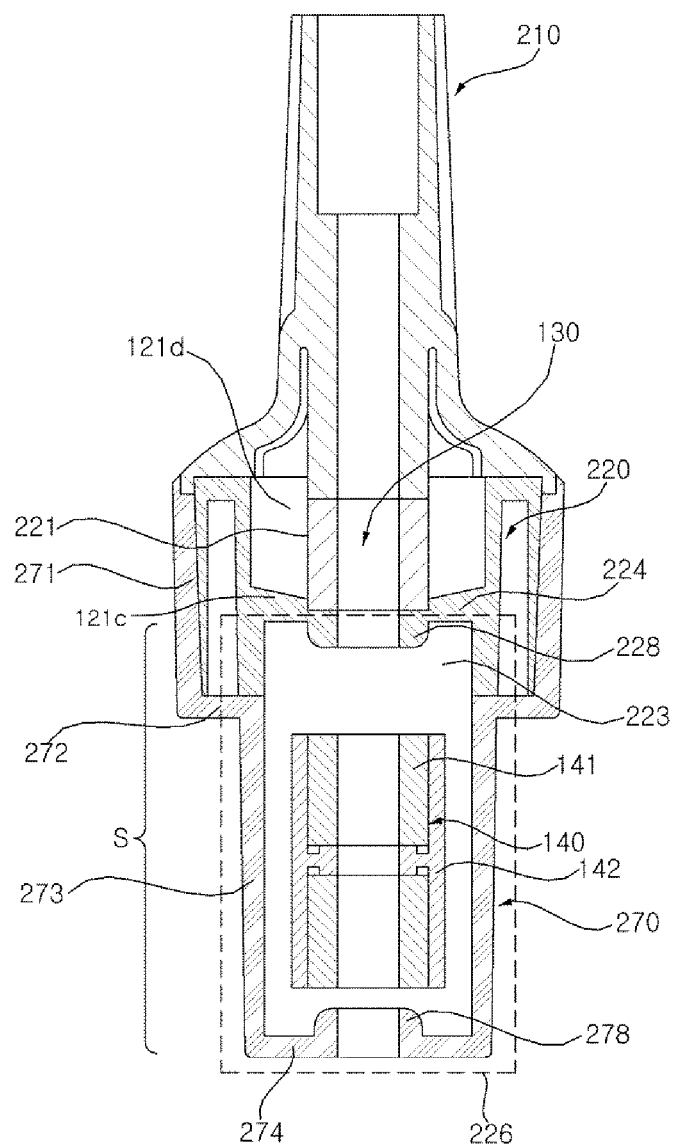
FIG. 7 is a view illustrating a suspension according to a second embodiment of the present invention.

FIG. 7 is a view illustrating a suspension according to a second embodiment of the present invention. FIG. 8 illustrates the partially disassembled state of the suspension illustrated in FIG. 7. More particularly, FIG. 8 illustrates a first receiving portion 221 without first friction member 130.

Referring to FIGS. 7 and 8, suspension 200 may include an outer tub supporter 210, a receiving body 220 and 270, first friction unit (130, see FIG. 6), second friction unit 140, and elastic member (150, see FIG. 3). Outer tub supporter 210 has substantially the same configuration as outer tub supporter 110 according to the previously described embodiment and a detailed description thereof follows the above description and thus will be omitted below.

Receiving body 220 and 270 may retain first friction unit 130 and second friction unit 140 and may be integrally moved with first friction unit 130, but may be displaceable relative to second friction unit 140 when being moved along support rod 15.

More specifically, the receiving body includes a first receiving portion forming part 220 which forms first receiving portion 221 and a second receiving portion forming part 270 which forms a space for the reception of second friction unit 140 along with first receiving portion forming part 220 inserted thereinto. That is, in the present embodiment, a second receiving portion 226 for the reception of second friction unit 140 is constituted of first receiving portion forming part 220 and second receiving portion forming part 270. A partition 224 is formed at first receiving portion forming part 220, and first receiving portion 221, which corresponds to a portion above partition 224, is substantially identical to first receiving portion 121 of the previously described embodiment.

An upward indentation 223 is formed in the lower surface of first receiving portion forming part 220, and second friction unit 140 may be inserted upward into indentation 223 during vibration. Of course, indentation 223 may not be formed in first receiving portion forming part 220, and the space for the reception of second friction unit 140 may be formed only in second receiving portion forming part 270.

Second receiving portion forming part 270 includes an upper side portion 271 which protrudes further outward than does a lower side portion 273. A stepped portion 272, which corresponds to the difference between the outer diameters of upper side portion 271 and lower side portion 273, is supported by elastic member 150. In addition, partition 224 is formed at first receiving portion forming part 220 such that first friction member 130 is seated on partition 224. A protrusion 228 may protrude downward from the lower surface of partition 224 toward the space for the reception of second friction unit 140. In addition, a protrusion 278 may be formed at a bottom portion 274 of second receiving portion forming part 270 so as to protrude upward toward the space for the reception of second friction unit 140. These protrusions 228 and 278 may come into contact with second friction members 141 in the same manner as protrusions 128a and 128b of the previously described embodiment.

Meanwhile, in the same manner as the previously described embodiment, first receiving portion 221 may be formed with a plurality of radial ribs 121d having inner ends which converge toward the center, through which support rod 15 passes. First receiving portion 121 has substantially the same configuration as first receiving portion 121 of the previously described embodiment, but has a difference in that it is included in first receiving portion forming part 220 independently of second receiving portion forming part 270 in the present embodiment.

FIG. 8(a) is a view illustrating a suspension according to a third embodiment of the present invention, and FIGS. 8(b) and 8(c) are views respectively illustrating a friction member and a receiving body applied to the suspension. Referring to FIG. 8, suspension 300 according to the third embodiment of the present invention has a configuration similar to that of suspension 100 according to the previously described embodiment and includes an outer tub supporter 310, a receiving body 320, elastic member 150, first friction unit 130 (see, FIG. 6), and a second friction unit 340. The first and second friction unit 130, 340 may have friction member 341, respectively.

Receiving body 320 may retain first friction unit 130 and second friction unit 340. When being moved along support rod 15, receiving body 320 may be moved integrally with the first friction unit or the first friction member 130, but may be displaceable relative to second friction unit 340.

More specifically, receiving body 320 may include a first receiving portion 321 and a second receiving portion 326. Although not illustrated in FIG. 8, first friction member (130) is received in first receiving portion 321.

First receiving portion 321 may include a plurality of first ribs 321b which extend from an inner circumferential surface 321a, delimiting the space for the reception of first friction member 130, toward the center at which support rod 15 is located, and a plurality of second ribs 321d which protrude from the upper surface of a partition 321c, configured to separate first receiving portion 321 and second receiving portion 326 from each other, i.e. from the bottom surface of first receiving portion 321 so as to support first friction member 130. First ribs 321b come into contact with the outer circumferential surface of first friction member 130, and second ribs 321*d* come into contact with a lower end of first friction member 130.

Second ribs 321*d* may extend toward the center by a longer length than first ribs 321*b*. An annular rib 321*e* may protrude along the periphery of an aperture formed in partition 321*c* for the passage of support rod 15. In this case, second ribs 321*d* may extend to annular rib 321*e*.

A prescribed gap is formed between the bottom surface of first receiving portion 321 and first friction member 130 by second ribs 321*d*. Thus, lubricant injected into first receiving portion 321 may move downward through spaces between first ribs 321*d* to thereby gather between second ribs 321*d*. First friction member 130 may be formed of a porous fiber material for excellent absorbency.

Second friction unit 340 may include a cylindrical friction member 341, into which support rod 15 is inserted, and a tubular friction member housing 342 in which friction member 341 is received. Upper and lower ends of friction member 341 protrude outward from friction member housing 342 so as to respectively come into contact with protrusion 128*a* formed at the lower surface of partition 321*c* and protrusion 128*b* protruding upward from bottom portion 324 of second receiving portion 326 during movement thereof.

The washing machine as described above has the effect of enabling simple supplementation of the lubricant in the suspension. In particular, the lubricant may be directly injected to the friction unit, which applies frictional force between the friction unit and the support rod.

In addition, the receiving body, in which the friction unit, which applies frictional force between the friction unit and the support rod, is received, is separable from the outer tub supporter which supports the outer tub at the upper side of the receiving body, which enables the lubricant to be directly injected to the receiving body in the state in which the outer tub supporter is lifted, resulting in simplified supplementation and maintenance of the lubricant.

In addition, the washing machine may effectively attenuate vibrations not only in the normal vibration state, in which the amplitude of vibration of the outer tub is within a prescribed range, but also in the excessive vibration state, in which the amplitude of vibration of the outer tub deviates from the prescribed range.

Additionally, by attenuating vibrations of the outer tub, the washing machine has the effect of improving the utility of space inside the casing and, especially, increasing the capacity of the outer tub compared with the related art.

The washing machine has the effect of achieving enhanced durability and stability and reducing the generation of noise due to vibrations.

Figure 9:
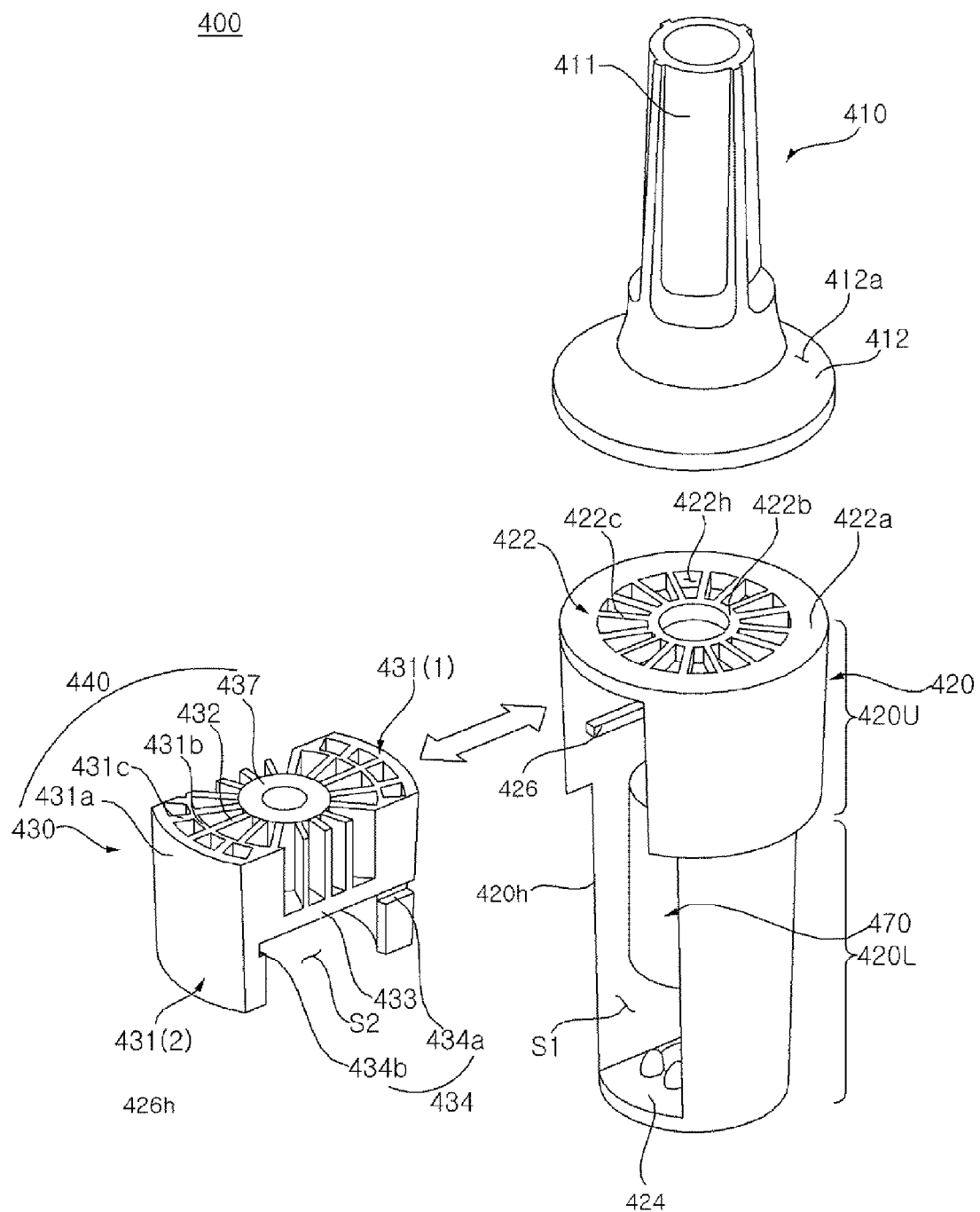
FIG. 9 is an exploded perspective view illustrating a suspension according to a fourth embodiment of the present invention.
Figure 10:
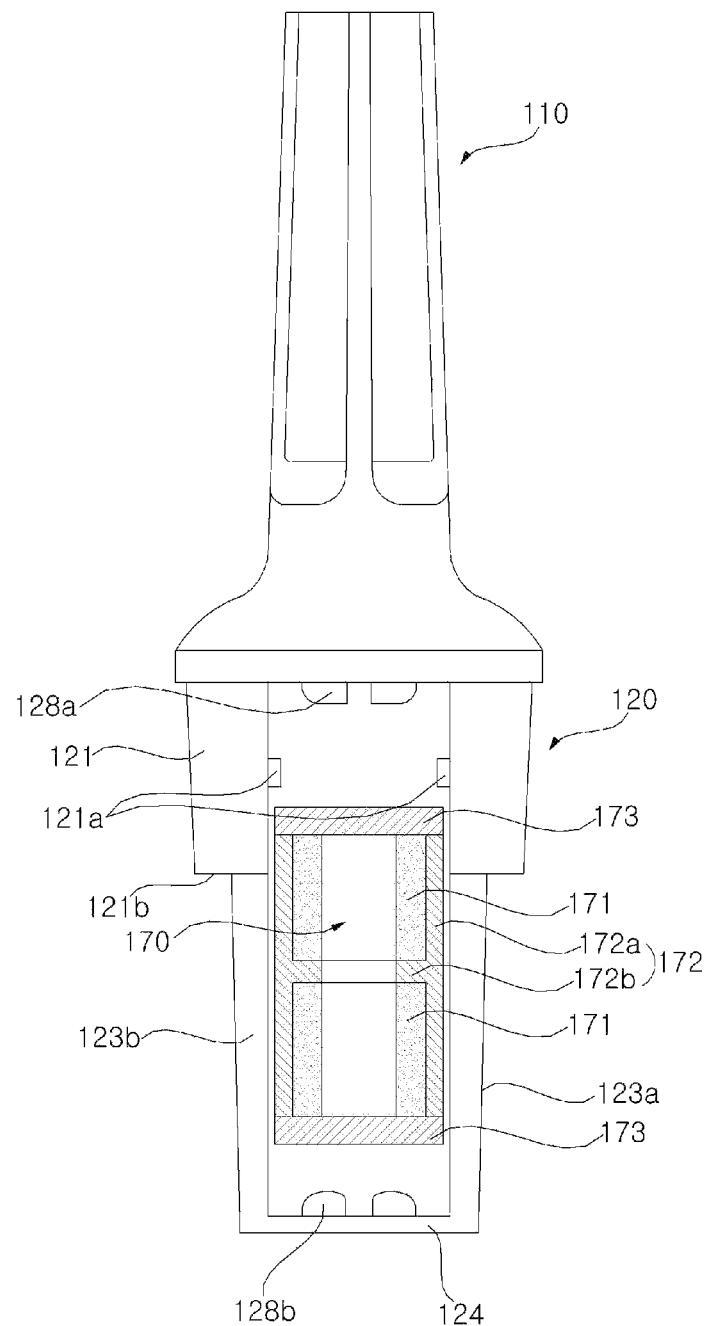
FIG. 10 is a front view of the suspension illustrated in FIG. 9.

FIG. 9 is an exploded perspective view illustrating a suspension according to a fourth embodiment of the present invention. FIG. 10 is a front view of the suspension illustrated in FIG. 9.

Referring to FIGS. 9 and 10, suspension 400 according to the fourth embodiment of the present invention includes an outer tub supporter 410, a receiving body 420, elastic member (150, see FIG. 3), a first friction unit 440, and a second friction unit 470.

Outer tub supporter 410 is configured to support outer tub 2 and is movable along support rod 15. Outer tub supporter 410 may include a tubular slider 411 for the penetration of support rod 15 and a seating portion 412 expanding outward from slider 411 to form a seating surface 412*a* on which outer tub 2 is seated. Seating portion 412 may be caught by mount 2*a* of outer tub 2 and at least a portion of slider 411 may protrude upward from mount 2*a*. A lubricant such as, for example, grease may be applied to a portion of slider 411 coming into contact with support rod 15 (i.e., the inner circumferential surface of an inner elongated bore).

First friction unit 440 and second friction unit 470 are movable along support rod 15 respectively such that frictional force (more particularly, kinetic friction during the vibration of outer tub 2) is generated between the respective friction units and support rod 15. First friction unit 440 and second friction unit 470 may respectively include friction members to apply frictional force between the friction units and the outer circumferential surface of support rod 15.

The friction members may be formed of a porous fiber material such as, for example, felt, or may be formed of an elastic material such as, for example, rubber. In addition, in terms of the shape, the friction members may have a tubular shape so as to be fitted around support rod 15, or may take the form of a flexible sheet or band so as to be wound around the outer circumferential surface of support rod 15. In particular, the fibrous friction member has excellent absorbency for a lubricant. Hereinafter, the friction member included in first friction unit 440 is referred to as a first friction member 437 and the friction member included in second friction unit 470 is referred to as a second friction member 471.

Receiving body 420 may retain first friction unit 440 and second friction unit 470. When being moved along support rod 15, receiving body 420 may be moved integrally with first friction unit 440, but may be displaceable relative to second friction unit 470.

Receiving body 420 is movable along support rod 15 and is elastically supported by elastic member (150, see FIG. 3). A portion of receiving body 420 is located inside elastic member 150 and the remaining portion is supported by elastic member 150 at the outside of elastic member 150. When dividing receiving body 420 on the basis of the portion supported by elastic member 150, receiving body 420 includes a receiving body upper portion 420U above supported portion and a receiving body lower portion 420L below the supported portion. Receiving body upper portion 420U protrudes further outward than does receiving body lower portion 420L, and a lower end of the protruding portion is supported by the upper end of elastic member 150.

A prescribed receiving space S1 is formed inside receiving body 420. Receiving space S1 extends by a long length in the longitudinal direction, and the extending length is longer than the longitudinal length of second friction unit 470. Support rod 15 longitudinally crosses receiving space S1, and second friction unit 470 is movable along support rod 15 within receiving space S1.

Receiving body 420 has lateral openings 420*h* which are open in the transverse direction, and receiving space S1 is exposed to the outside through lateral openings 426. First friction unit 440 and second friction unit 470 are inserted into receiving space S1 through lateral openings 420*h*. Lateral openings 420*h* may be formed respectively at both sides of receiving body 420. Lateral openings 420*h* function to provide easy installation and separation of friction units 440 and 470 and to radiate heat generated from friction units 440 and 470. In addition, the lubricant may be directly injected to friction units 440 and 470 through lateral openings 420*h*, which realizes convenience in maintenance and repair.

In the embodiment, receiving body 420 may include a main body bottom portion 424 which delimits a lower end of receiving space S1, a main body top portion 422 which delimits an upper end of receiving space S1 and is configured to support outer tub supporter 410, and one or more main body side portions 423a and 423b which connect main body bottom portion 424 and main body top portion 422 to each other. In the present embodiment, two lateral openings 420h are provided between the first main body side portion 423a and the second main body side portion 423b. Alternatively, in some embodiments, lateral openings 420h may be formed in a side portion connecting main body bottom portion 424 and main body top portion 422 to each other. In this case, two lateral openings may be formed in a single tubular side portion surrounding support rod 15 so as to be symmetrical to each other about support rod 15.

According to the embodiment in which receiving body 420 is divided into upper portion 420U and lower portion 420L, upper portions of first main body side portion 423a and second main body side portion 423b constitute receiving body upper portion 420U and lower portions of first main body side portion 423a and second main body side portion 423b constitute receiving body lower portion 420L.

First friction unit 440 is coupled to receiving body 420 in the transverse direction. In particular, first friction unit 440 may be coupled to receiving body upper portion 420U. Receiving body upper portion 420U is supported by elastic member 150 and, therefore, protrudes further outward than does receiving body lower portion 420L. Accordingly, the upper portions of side portions 423a and 423b constituting receiving body upper portion 420U must be thicker than the lower portions of side portions 423a and 423b constituting receiving body lower portion 420L. In general, injection molding causes greater constriction as the material thickness increases. Thus, to prevent constriction of receiving body upper portion 420U during injection molding, receiving space S1 is formed to extend into receiving body upper portion 420U, and a friction member fixing frame 430, configured to install first friction member 437 to receiving body 420, is formed separately from receiving body 420 and installed through lateral openings 420h formed in receiving body 420. In addition, even if the portion of receiving body 420 supported by elastic member 450 has a small thickness, receiving body 420 may have very firm structural strength thanks to friction member fixing frame 430 located inside receiving body 420 and, in particular, may achieve sufficient durability because at least a portion of fixing frame 430 is supported, along with receiving body 420, by elastic member 150.

Friction member fixing frame 430 may include a first frame side portion 431(1) and a second frame side portion 431(2) which face each other, a frame bottom portion 433 which connects first frame side portion 431(1) and second frame side portion 431(2) to each other and supports first friction member 437, and a plurality of ribs 432 which protrudes from the upper surface of frame bottom portion 433 and is radially arranged to converge toward the center at which support rod 15 is located. First friction member 437 is interposed between inner ends of ribs 432 and support rod 15. Ribs 432 may be symmetrically arranged.

Friction member fixing frame 430 may be supported by elastic member 150 while being coupled to receiving body 420. Friction member fixing frame 430 protrudes outward from receiving body lower portion 420L, and a protruding portion of friction member fixing frame 430 may be supported by elastic member 150. In the embodiment, lower ends of frame side portions 431(1) and 431(2) are supported, along with receiving body upper portion 420U, by elastic member 150.

Lubricant may be received in friction member fixing frame 430. First friction member 437 may be submerged in the lubricant depending on the materials thereof and some of the lubricant may permeate through a gap between first friction member 437 and frame bottom portion 433 to reach support rod 15.

Some of ribs 432 are connected at outer ends thereof to first frame side portion 431(1) or second frame side portion 431(2), whereas outer ends of the remaining ribs 432 are exposed through openings between first frame side portion 431(1) and second frame side portion 431(2). In a state in which friction member fixing frame 430 is coupled to receiving body 420, the openings between first frame side portion 431(1) and second frame side portion 431(2) are blocked by the inner surface of receiving body upper portion 420U. In this way, the leakage of the lubricant received between ribs 432 is prevented.

Frame side portions 431(1) and 431(2) may have a lattice-shaped cross section. Each of the frame side portions 431(1) and 431(2) may include an outer sidewall 431a, an inner sidewall 431b, and a plurality of lattice-shaped ribs 431c formed between the outer sidewall 431a and the inner sidewall 431b.

Meanwhile, the main body top portion 422 of receiving body 420 may be formed with top openings 422h which enables the communication between receiving space S1 and the outside. In this case, heat generated by first friction member 437 is radiated through top openings 422h. Main body top portion 422 may include an outer circumferential portion 422a connected to main body side portions 423a and 423b, an inner circumferential portion 422b formed with an aperture for the passage of support rod 15, and a plurality of top ribs 422c which connect the outer circumferential portion 422a and the inner circumferential portion 422b to each other. Top openings 422h may be formed by gaps between top ribs 422c. Top ribs 422c may radially extend.

Any one of first friction unit 440 and receiving body 420 may be formed with a guiding rib 426 extending in the transverse direction and the other one may be formed with a guiding groove 434 to guide the insertion of guiding rib 426 when first friction unit 440 and receiving body 420 are coupled to each other. In the embodiment, guiding rib 426 extends, by a long length, in the transverse direction from receiving body 420 so as to protrude toward receiving space S1, and friction member fixing frame 430 is formed with guiding groove 434 such that guiding rib 426 is inserted into first frame side portion 431(1) and second frame side portion 431(2). Here, guiding groove 434 formed in first frame side portion 431(1) is open in the transverse direction to allow guiding rib 426 to pass through first frame side portion 431(1), and guiding groove 434 formed in second frame side portion 431(2) is blocked at one side thereof to limit the movement of guiding rib 426.

Second friction unit 470 may further include a friction member housing 472 in which second friction members 471 are received at upper and lower positions. Friction member housing 472 may include a tubular housing side portion 472a and a division plate 472b which divides the space inside housing side portion 472a into upper and lower spaces, support rod 15 penetrating division plate 472b. Friction member housing 472 may receive respective second receiving members 471 in the upper and lower spaces divided by division plate 472b.

Second friction unit 470 may further include shock absorbing members 473 provided above and/or below friction member housing 472. Shock absorbing members 473 may be formed of a porous fiber material such as, for example, felt, and serve to alleviate shocks between second friction unit 470 and receiving body 420 and to reduce collision noise therebetween.

Meanwhile, an upper region of first receiving space S1 formed in receiving body 420 is occupied by first friction unit 440, and second friction unit 470 is displaceable relative to receiving body 420 below first friction unit 440, i.e. in a lower region of receiving space S1. Hereinafter, the region of receiving space S1, in which the displacement of second friction unit 470 is permitted, is defined as a displacement permission space.

First frame side portion 431(1) and second frame side portion 431(2) may extend downward from frame bottom portion 433. In this case, the displacement permission space reaches a groove S2 between first frame side portion 431(1) and second frame side portion 431(2).

Friction between the two friction units 440 and 470 and support rod 15 exhibits different aspects based on the amplitude of vibration of outer tub 2. For example, when operating the washing machine, in the case where outer tub 2 resonates based on the physical properties of the entire vibration system, or for an excessive vibration period, during which excessive vibrations are generated due to the unbalanced arrangement of clothing inside inner tub 3, first friction unit 440 and second friction unit 470 are moved integrally with outer tub supporter 410, causing kinetic friction between friction units 440 and 470 and support rod 15. Accordingly, for the excessive vibration period, vibration energy is positively dissipated by friction of both the first and second friction units 440 and 470.

On the other hand, for a period, during which the amplitude of vibration of outer tub 2 is sufficiently lower than that of the excessive vibration period (e.g., a normal vibration period), only first friction unit 440 performs vibration attenuation by friction. That is, second friction unit 470 may remain stationary at a prescribed position on support rod 15 while being separated from receiving body 420 when first friction unit 440 is moved along support rod 15. Outer tub 2 can vibrate relatively freely while vibration attenuation by friction is implemented only by first friction unit 440.

That is, when operating the washing machine, suspension 400 implements vibration attenuation using one friction unit 440 during the relatively stable period, but implements positive attenuation by friction using the two friction units 440 and 470 during the excessive vibration period. That is, the washing machine according to the present embodiment allows outer tub 2 to be moved relatively freely within a predetermined allowable amplitude range in consideration of, for example, the durability of the appliance and an allowable vibration displacement, but positively attenuates vibrations to limit the amplitude of vibration when vibrations are generated beyond a given level. As such, the washing machine shows different aspects of vibration attenuation based on the amplitude of vibration.

To allow vibration attenuation by first friction unit 440 and second friction unit 470 to be implemented in different aspects depending on the amplitude of vibration of outer tub 2, first, the maximum displacement of second friction unit 470 must be greater than the maximum displacement of first friction unit 440 which is permitted due to their relationships with respect to receiving body 420. First friction unit 440 must be fixed to receiving body 420 and second friction unit 470 must be permitted to be displaced relative to receiving body 420 within the space delimited by receiving body 420. In this sense, first friction unit 440 is fixed to receiving body 420 so as to be integrally moved with receiving body 420, and the displacement permission space may be longer than the longitudinal length of second friction unit 470.

Second friction unit 470 is moved along support rod 15 when the amplitude of vibration of outer tub 2 becomes a given level or higher. Second friction unit 470 is moved downward by being pushed by first friction unit 440 and is moved upward by being pushed by main body bottom portion 424 of receiving body 420.

Friction member fixing frame 430 of first friction unit 440 may include at least one protrusion 428a which protrudes downward. Protrusion 428a may be formed around an aperture for the penetration of support rod 15. Second friction unit 470 comes into contact with the protrusion 428a during downward movement. Protrusion 428a may be located to come into contact with second friction member 471.

Main body bottom portion 424 may include at least one protrusion 428b which protrudes upward. Protrusion 428b may be formed around the aperture for the penetration of support rod 15. Second friction unit 470 comes into contact with protrusion 428b during upward movement. Protrusion 428b may be located to come into contact with second friction member 471.

This structure in which the movement of second friction unit 470 is implemented via the contact between second friction members 471 and protrusions 428a and 428b has the effect of reducing a shock transmission area and reducing collision noise.

Meanwhile, in the present embodiment, although first friction unit 440 and second friction unit 470 are received in the single receiving space S1 extending from receiving body upper portion 420U to receiving body lower portion 420L, the present invention should not be limited thereto. In some embodiments, the space in which first friction unit 440 is received and the space in which second friction unit 470 is received may be independent of each other.

Outer tub supporter 410 supports outer tub 2 at the upper side of receiving body 420. Outer tub supporter 410 may be separably coupled to receiving body 420. This configuration ensures easy injection of lubricant. It is necessary to inject or supplement lubricant during the process of manufacturing the washing machine as well as when performing maintenance and repair during the useful lifetime thereof. At this time, outer tub supporter 410, separated from receiving body 420, is pushed upward to expose support rod 15 covered with outer tub supporter 410, and the lubricant may be directly applied to the exposed portion. In addition, the lubricant may also be injected to first friction unit 440 or second friction unit 470, which are arranged inside receiving body 420. This lubricant injection is very convenient because it can be performed even without separating suspension 400 from support rod 15.

Meanwhile, even if outer tub supporter 410 and receiving body 420 are not firmly coupled to each other, outer tub supporter 410 and receiving body 420 may be integrated with each other, i.e. they may be moved together along support rod 15 by the weight of outer tub 2 because outer tub supporter 410 supports outer tub 2 at the upper side of receiving body 420.

Figure 11:
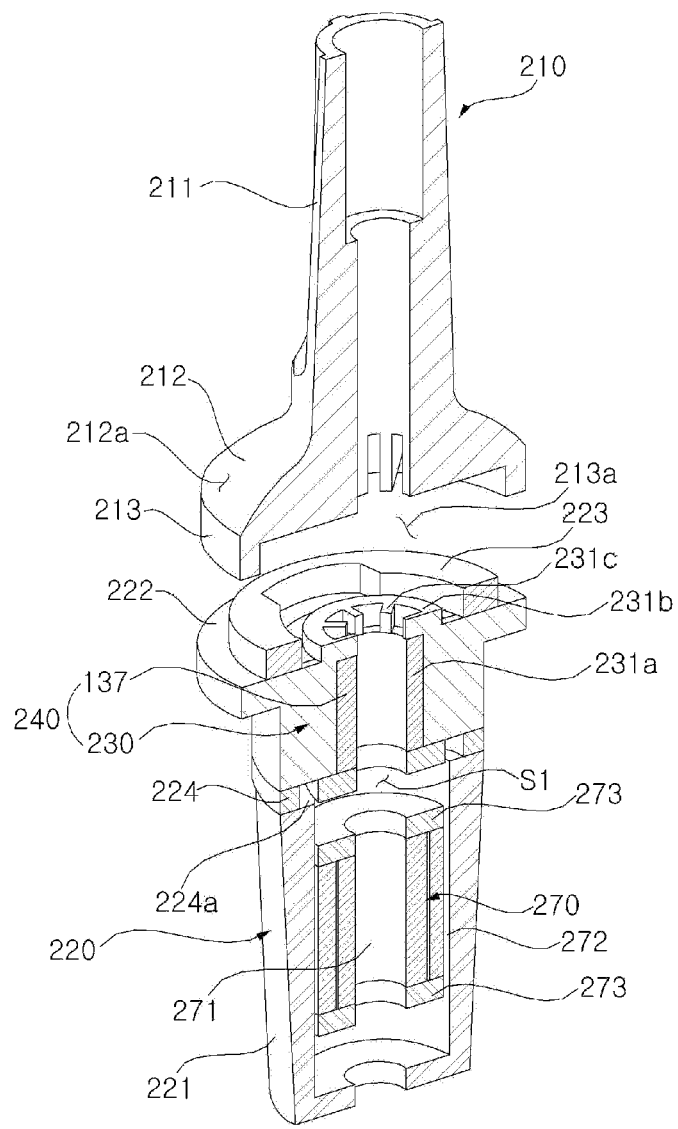
FIG. 11 is a longitudinal sectional view of a suspension according to a fifth embodiment of the present invention.
Figure 12:
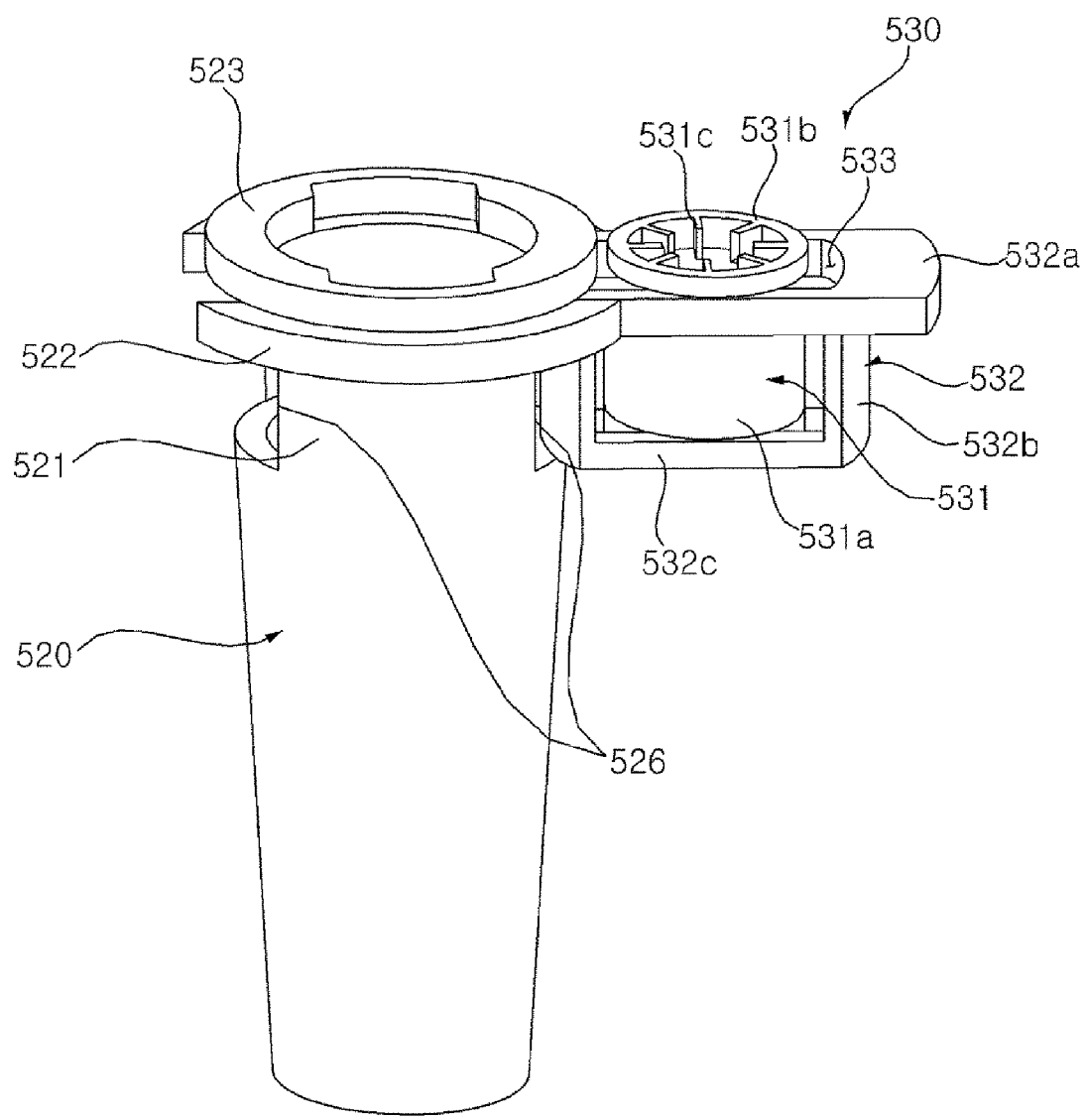
FIG. 12 is a view illustrating a coupling structure of a receiving body and a first friction unit of the suspension illustrated in FIG. 11.

FIG. 11 is a longitudinal sectional view of a suspension 500 according to a fifth embodiment of the present invention. FIG. 12 is a view illustrating a coupling structure of a receiving body 520 and a first friction unit 540 of suspension 500 illustrated in FIG. 11. Referring to FIGS. 11 and 12, suspension 500 according to the present embodiment includes an outer tub supporter 510, a receiving body 520, a first friction unit 540, a second friction unit 570, and elastic member (150, see FIG. 3).

Outer tub supporter 510 is configured to support outer tub 2 and is movable along support rod 15. Outer tub supporter 510 may include a tubular slider 511 for the penetration of support rod 15 and a seating portion 512 expanding outward from slider 511 to form a seating surface 512a on which outer tub 2 is seated. Seating portion 512 may be caught by mount 2a of outer tub 2 and at least a portion of slider 511 may protrude upward from mount 2a. A lubricant such as, for example, grease may be applied to a portion of slider 511 coming into contact with support rod 15 (i.e. the inner circumferential surface of an inner elongated bore). In addition, outer tub supporter 510 may be further formed with a coupling groove 513a into which a coupling protrusion 523 formed at an upper end of receiving body 520 is inserted. An annular lower end 513 may be formed below seating portion 512, and coupling groove 513a is surrounded by lower end 513.

Receiving body 520 may retain first friction unit 540 and second friction unit 570. When being moved along support rod 15, receiving body 520 may be moved integrally with first friction unit 540, but may be displaceable relative to second friction unit 570.

A receiving space S1 is formed inside receiving body 520, and a partition 524 divides receiving space S1 into upper and lower spaces. First friction unit 540 is supported by partition 524 in the divided upper space, and the lower space divided by partition 524 is a space in which second friction unit 570 is received and corresponds to a displacement permission space. Partition 524 may be formed with a plurality of through-holes 524a for the communication between the upper space and the lower space.

Receiving body 520 may include a main body side portion 521 delimiting the periphery of receiving space S1, and main body side portion 521 may be formed with a lateral opening 526 for the insertion of first friction unit 540. Two lateral openings 526 may be formed in the transverse direction in which the insertion of first friction unit 520 is implemented.

Receiving body 520 may include an outer circumferential protruding portion 522 which protrudes outward from main body side portion 521 and is supported by elastic member 550. Outer circumferential protruding portion 522 supports lower end 513 of seating portion 512 thereabove and is supported by elastic member 550 located therebelow.

First friction unit 540 includes a first friction member 537 and a friction member fixing frame 530 to receive first friction member 537 therein. Friction member fixing frame 530 is inserted into receiving space S1 through lateral opening 526 of main body side portion 521.

Friction member fixing frame 530 may include a tubular friction member holder 531 in which first friction member 537 is received and a holder mount 532 which is integrally formed with friction member holder 531 and is supported by receiving body 520.

Friction member holder 531 includes a tubular holder body 531a which is vertically open to receive first friction member 537 therein. Holder body 531a is fitted around support rod 15. A plurality of ribs 531c may protrude from an upper end 531b of holder body 531a. Ribs 531c may radially extend to converge toward the center at which support rod 15 is located. Although upper end 531b of holder body 531a is open, ribs 531c prevent first friction member 537 from being separated from holder body 531. In addition, heat generated by the friction of first friction member 537 may be radiated through open upper end 531b of holder body 531a.

Holder mount 532 may be integrally formed with friction member holder 531. Holder mount 532 may include a portion 532a which is supported, along with outer circumferential protruding portion 522, by elastic member 150 while being coupled to receiving body 520, a lower frame 532c which supports a lower end of friction member holder 531 and is disposed on partition 524, and a side frame 532b which connects supported portion 532a and lower frame 532c to each other. A gap 533 may be formed between supported portion 532a and holder body 531.

In a state in which first friction unit 540 and receiving body 520 are completely assembled with each other, a lower end of supported portion 532a is located at the same height as a lower end of outer circumferential protruding portion 522. The lower end of supported portion 532a and the lower end of outer circumferential protruding portion 522 define a single common plane supported by elastic member 150 and is stably supported by elastic member 550.

Meanwhile, upper end 531b of holder body 531 protrudes upward from supported portion 532a and is surrounded by coupling protrusion 523 of receiving body 520. As exemplarily illustrated in FIG. 12, coupling protrusion 523 takes the form of a single perfect circle and may interfere with upper end 531b of holder body 531 during the assembly process. In the present embodiment, friction member fixing frame 530 is formed of an elastic material so as to be deformed to some extent. Thereby, when slight force is applied during the assembly process, upper end 531b of holder body 531 may be bent to thereby be inserted into a space inside coupling protrusion 523.

In contrast, when holder body 531 is formed of a hard material, an avoidance recess may be formed in coupling protrusion 523 to prevent interference with upper end 531b of holder body 531.

Second friction unit 570 may include a friction member housing 572 in which second friction member 571 is received.

Second friction unit 570 may further include a shock absorbing member 573 provided above and/or below friction member housing 572. Shock absorbing member 573 may be formed of a porous fiber material such as, for example, felt, and serve to alleviate shocks between second friction unit 570 and receiving body 520 and to reduce collision noise therebetween.

Meanwhile, the outer tub supporter, the receiving body, and the first friction member fixing frame according to the above-described embodiments may be formed of synthetic resins using injection molding.

As is apparent from the above description, the washing machine of the present embodiments has the effect of enabling simple supplementation of lubricant in a suspension.

In addition, the present embodiments have the effect of reducing the thickness of an injection molded component, thereby preventing constriction of the component during injection molding and achieving sufficient durability.

In addition, since a receiving body, which receives a friction unit to generate frictional force along with a support rod, is separable from an outer tub supporter which supports an outer tub at the upper side of the receiving body, the present embodiments have the effect of enabling the lubricant to be directly injected into the receiving body by lifting the outer tub supporter, resulting in simplified supplementation and maintenance of the lubricant.

In addition, the present embodiments have the effect of effectively attenuating vibrations in the normal vibration state, in which the amplitude of vibration of the outer tub is within a prescribed range, and in the excessive vibration state, in which the amplitude of vibration of the outer tub is relatively great.

In addition, the present embodiments have the effect of attenuating vibrations of the outer tub, thereby achieving the improved utility of space inside a casing and, especially, the increased capacity of the outer tub compared with the related art.

In addition, the present embodiments have the effect of achieving enhanced durability and stability and reducing the generation of noise due to vibrations.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A washing machine comprising:
    a casing;
    an outer tub disposed within the casing to receive wash water therein;
    a support rod having one end connected to the casing, the other end of the support rod having a support prop;
    a first friction unit and a second friction unit movable along the support rod applying a frictional force between the first and second friction units and the support rod;
    a receiving body movable along the support rod, the receiving body retaining the first friction unit and the second friction unit,
    wherein the receiving body is integrally moved with the first friction unit and displaceable relative to the second friction unit;
    an outer tub supporter movable along the support rod, the outer tub supporter being formed independently of the receiving body to support the outer tub at the upper side of the receiving body; and
    an elastic member supported by the support prop and elastically supporting the receiving body,
    wherein the receiving body includes a partition to separate a first receiving portion for reception of the first friction unit from a second receiving portion for reception of the second friction unit, and
    wherein the first receiving portion includes:
        a tubular upper side portion extending upward from the partition, the support rod being located at a center of the tubular upper side portion; and
        a plurality of ribs arranged in a circumferential direction, each rib radially protruding from an inner circumferential surface of the upper side portion toward the center,
        wherein the first friction unit is disposed between an inner circumference formed by the plurality of ribs and the support rod, and between the adjacent ribs is provided a hollow space filled with lubricant to enable transferring of the lubricant from an upper side portion to a lower side portion along an outer surface of the first friction unit.

2. The washing machine of claim 1, wherein the ribs are connected at lower ends thereof to the partition.

3. The washing machine of claim 1, wherein the first friction unit includes a friction member having one surface in contact with the support rod and the other surface, opposite to the one surface, being pushed by the ribs facing the center.

4. The washing machine of claim 3, wherein the friction member is formed of a porous fiber material.

5. The washing machine of claim 1, wherein the outer tub supporter is separable from the receiving body.

6. The washing machine of claim 5, wherein the second receiving portion is formed below the first receiving portion and the first receiving portion has an opening formed in a top surface thereof facing the outer tub supporter to allow the first friction unit to be introduced thereinto or removed therefrom in a state in which the receiving body is separated from the outer tub supporter.

7. The washing machine of claim 1, wherein the receiving body has an opening in a lateral direction so as to outwardly expose the second friction unit.

8. The washing machine of claim 1, wherein the receiving body includes:
    a first receiving portion forming part to form the first receiving portion for reception of the first friction unit; and
    a second receiving portion forming part coupled to the first receiving portion forming part, the second receiving portion forming part to form the second receiving portion for reception of the second friction unit below the first receiving portion form part.

9. The washing machine of claim 8, wherein the first receiving portion forming part is disposed inside the second receiving portion forming part.

10. The washing machine of claim 9, wherein the elastic member elastically supports the second receiving portion forming part.

11. The washing machine of claim 8, wherein at least a portion of the second receiving portion is formed inside the first receiving portion forming part.

12. A washing machine comprising:
    a casing;
    an outer tub disposed within the casing to receive wash water therein;
    a support rod having one end connected to the casing, the other end of the support rod having a support prop;
    a first friction unit and a second friction unit movable along the support rod applying a frictional force between the first and second friction units and the support rod;
    a receiving body movable along the support rod, the receiving body retaining the first friction unit and the second friction unit,
    wherein the receiving body is integrally moved with the first friction unit and displaceable relative to the second friction unit;
    an outer tub supporter movable along the support rod, the outer tub supporter being formed independently of the receiving body to support the outer tub at the upper side of the receiving body;
    an elastic member supported by the support prop and elastically supporting the receiving body; and
    a damping member interposed between the outer tub supporter and the receiving body,
    wherein in a top surface of the receiving body facing the outer tub supporter is formed an opening to allow the first friction unit to be introduced thereinto or removed therefrom in a state in which the receiving body is separated from the outer tub supporter, and the damping member is seat on the top surface,
    wherein the receiving body includes a first receiving portion to delimit a space for reception of the first friction unit, wherein the damping member has an opening communicating with the interior of the first receiving portion, wherein the first receiving portion includes a plurality of ribs extending toward a central region for passage of the support rod, and wherein the opening is located to correspond to gaps between the ribs.

13. The washing machine of claim 12, wherein the damping member is formed of an elastic material.

14. A washing machine comprising:

a casing;

an outer tub disposed within the casing to receive wash water therein;

a support rod having one end connected to the casing, the other end of the support rod having a support prop;

a first friction unit and a second friction unit movable along the support rod applying a frictional force between the first and second friction units and the support rod;

a receiving body movable along the support rod, the receiving body retaining the first friction unit and the second friction unit, wherein the receiving body is integrally moved with the first friction unit and displaceable relative to the second friction unit;

an outer tub supporter movable along the support rod, the outer tub supporter being formed independently of the receiving body to support the outer tub at the upper side of the receiving body; and an elastic member supported by the support prop and elastically supporting the receiving body, wherein the first friction unit is coupled to the receiving body in a lateral direction so as to be integrally moved with the receiving body, wherein the receiving body includes an opening in a lateral direction so as to communicate a receiving space for reception of the first friction unit with the outside, wherein the first friction unit is inserted into the receiving space through the opening in a state in which the receiving body is separated from the support rod, and wherein the first friction unit includes:

a friction member in contact with the support rod; and a friction member fixing frame to receive the friction member therein, the friction member fixing frame being supported, along with the receiving body, by the elastic member, wherein the friction member fixing frame includes a first surface and the receiving body includes a second surface which belongs to a same plane as the first surface and the first and second surfaces are supported by the elastic member.

15. The washing machine of claim 14, wherein the first friction unit is slidingly coupled to the receiving body.

16. The washing machine of claim 14, wherein the receiving body includes an upper portion protruding further outward than a lower portion thereof such that the upper portion is supported by the elastic member, the space for reception of the first friction unit being formed in the upper portion.

17. The washing machine of claim 14, wherein the friction member fixing frame includes a plurality of ribs radially arranged to converge toward a central region, and wherein the friction member is disposed between the ribs and the support rod.

18. The washing machine of claim 17, wherein the friction member is formed of a porous fiber material, and lubricant is received between the ribs.

19. The washing machine of claim 14, wherein the receiving body includes a main body top portion to delimit an upper end of the receiving space, and wherein the main body top portion is formed with a plurality of openings communicating the receiving space with the outside.

20. The washing machine of claim 14, wherein any one of the first friction unit and the receiving body is formed with a guiding rib extending in a transverse direction, and the other one is provided with at least one guiding groove to guide insertion of the guiding rib when the first friction unit and the receiving body are coupled to each other.

21. The washing machine of claim 20, wherein the guiding groove has one blocked side to limit movement of the guiding rib.

22. The washing machine of claim 14, wherein the receiving body includes a partition to divide the receiving space into upper and lower regions, wherein the first friction unit is supported by the partition in the upper region of the receiving space, and wherein the second friction unit is disposed in the lower region of the receiving space.

23. The washing machine of claim 22, wherein the first friction unit includes:

a friction member in contact with the support rod;

a tubular friction member holder to allow the support rod to pass therethrough, the friction member being interposed between an inner circumferential surface of the friction member holder and the support rod; and a holder mount integrally formed with the friction member holder so as to be supported by the receiving body.

24. The washing machine of claim 23, wherein the holder mount is supported by the partition.

25. The washing machine of claim 23, wherein the friction member holder includes a plurality of ribs extending toward a central region, the ribs preventing the first friction unit from being separated through an open upper end.

26. The washing machine of claim 22, wherein the partition is formed with a plurality of through-holes communicating the upper and lower regions of the receiving space with each other.

27. The washing machine of claim 22, wherein at least a portion of the holder mount is supported by the elastic member.

28. A washing machine comprising:

a casing;

an outer tub disposed within the casing to receive wash water therein;

a support rod having one end connected to the casing, the other end of the support rod having a support prop;

a first friction unit and a second friction unit movable along the support rod applying a frictional force between the first and second friction units and the support rod;

a receiving body movable along the support rod, the receiving body retaining the first friction unit and the second friction unit, wherein the receiving body is integrally moved with the first friction unit and displaceable relative to the second friction unit;

an outer tub supporter movable along the support rod, the outer tub supporter being formed independently of the receiving body to support the outer tub at the upper side of the receiving body;

an elastic member supported by the support prop and elastically supporting the receiving body; and a damping member interposed between the outer tub supporter and the receiving body, wherein the receiving body includes a first receiving portion to delimit a space for reception of the first friction unit, wherein the damping member has an opening communicating with the interior of the first receiving portion, wherein the first receiving portion includes a plurality of ribs extending toward a central region for passage of the support rod, and wherein the opening is located to correspond to gaps between the ribs.

29. A washing machine comprising:

a casing;

an outer tub disposed within the casing to receive wash water therein;

a support rod having one end connected to the casing, the other end of the support rod having a support prop;

a first friction unit and a second friction unit movable along the support rod applying a frictional force between the first and second friction units and the support rod;

a receiving body movable along the support rod, the receiving body retaining the first friction unit and the second friction unit, wherein the receiving body is integrally moved with the first friction unit and displaceable relative to the second friction unit;

an outer tub supporter movable along the support rod, the outer tub supporter being formed independently of the receiving body to support the outer tub at the upper side of the receiving body;

an elastic member supported by the support prop and elastically supporting the receiving body; and a damping member interposed between the outer tub supporter and the receiving body, wherein in a top surface of the receiving body facing the outer tub supporter is formed an opening to allow the first friction unit to be introduced thereinto or removed therefrom in a state in which the receiving body is separated from the outer tub supporter, and the damping member is seat on the top surface, wherein the receiving body includes a first receiving portion to delimit a space for reception of the first friction unit, wherein the damping member has an opening communicating with the interior of the first receiving portion, wherein the first receiving portion includes a plurality of ribs extending toward a central region for passage of the support rod, and wherein the opening is located to correspond to gaps between the ribs.

* * * * *